Feb. 2, 1954  C. B. DE VLIEG  2,667,820
POWER TOOL LOCK
Filed Dec. 26, 1951  2 Sheets-Sheet 1
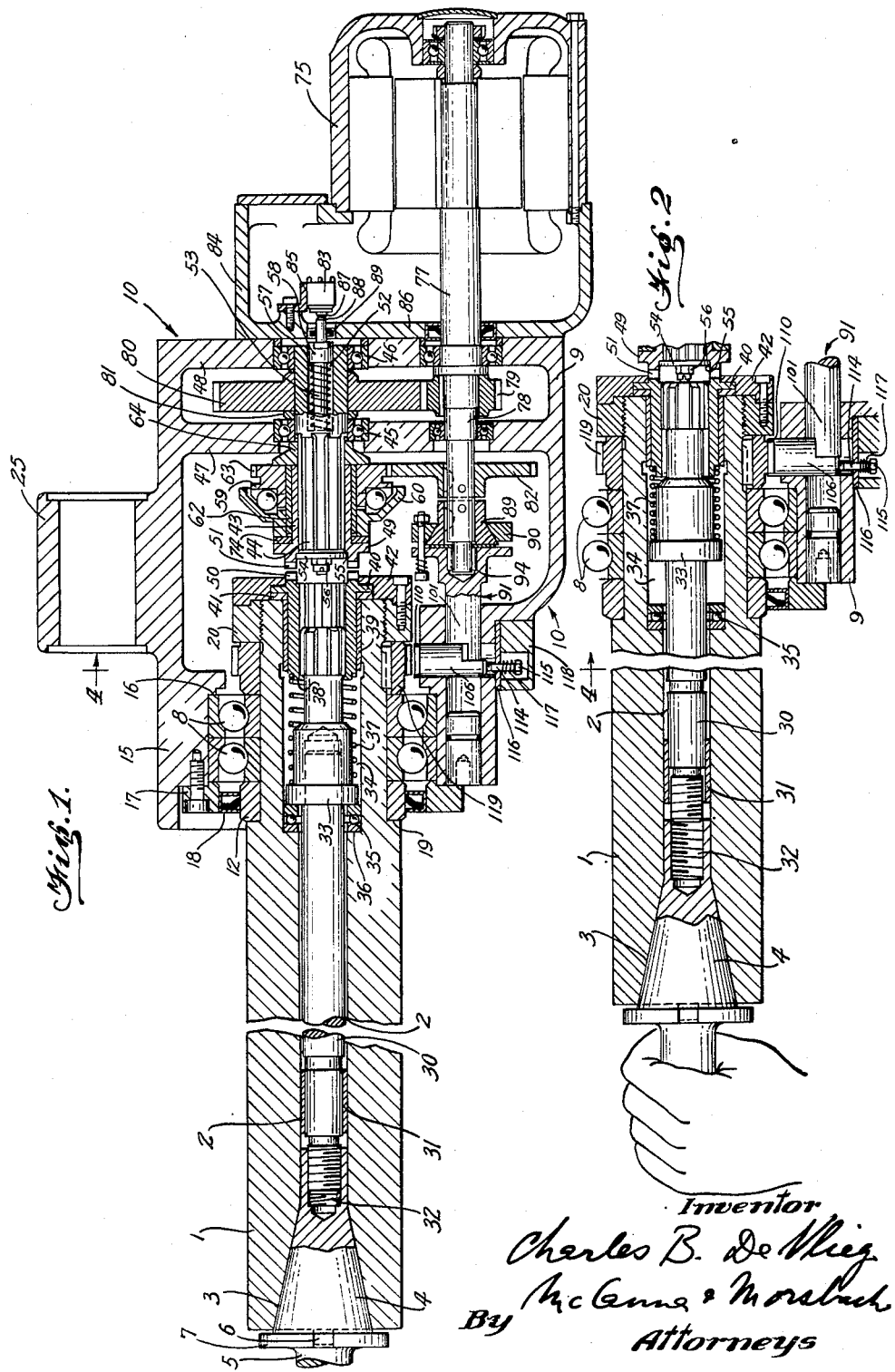
Inventor
Charles B. De Vlieg
By McGenna & Morsbach
Attorneys

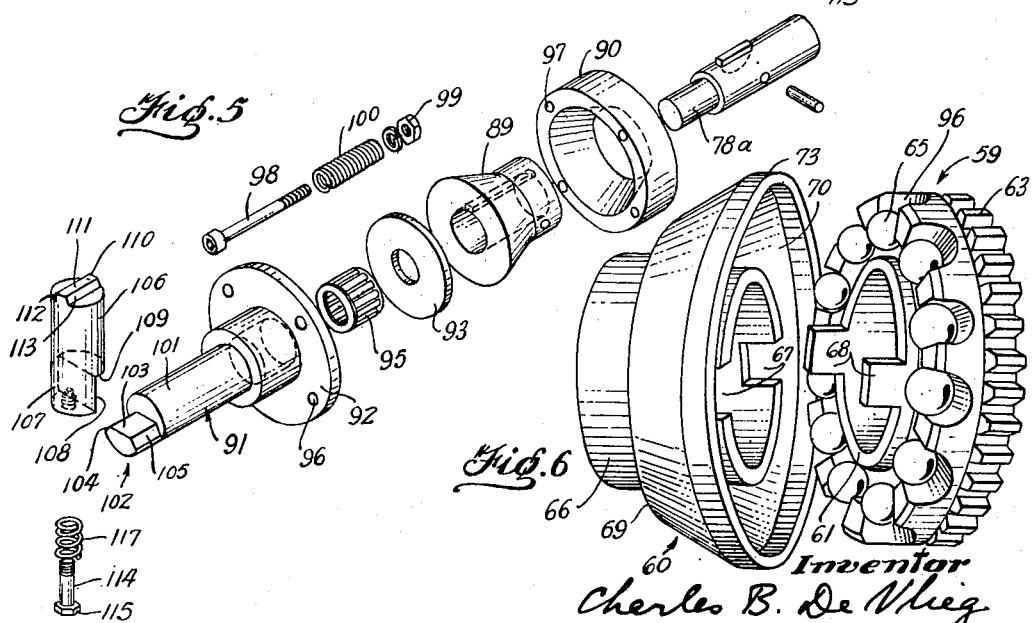

Patented Feb. 2, 1954

2,667,820

UNITED STATES PATENT OFFICE 2,667,820

POWER TOOL LOCK

Charles B. De Vlieg, Farmington, Mich.

Application December 26, 1951, Serial No. 263,281

8 Claims. (Cl. 90—11)

1

This invention relates to an improvement in mechanisms for locking in a tool spindle or the like and releasing therefrom a tool element or the like such as an arbor, a tool chuck, a boring bar, a tool adaptor, or any means for carrying a tool for boring, milling, turning, drilling or other metal cutting or treating means.

The tool locking mechanism of the present invention may desirably be incorporated in any machine tool. It is illustrated in the present embodiment in a machine tool of the type adapted for both milling and boring operations, and commonly known as a horizontal boring machine. As is well understood, such machines include a rotary spindle for holding a cutting tool or the like and means for advancing the spindle toward the work piece which is to be machined. While the present invention has particular utility in such machines, it is to be understood that the present locking mechanism may be used in other applications not limited to machine tools and is of general utility wherever it is desired to have automatic locking or release of coacting elements of the character contemplated by this invention.

In my copending application Serial No. 115,120, filed September 10, 1949, there has been described a novel automatic tool locking and releasing mechanism. The present invention represents an improvement over the mechanism shown in said application.

The present invention has for its principal object the provision of a tool locking and releasing mechanism which includes means for positively preventing rotation of the tool spindle during the locking in or the releasing of the tool from the spindle.

Another object of the invention is to provide means actuated in response to the movement of the driving mechanism for locking in or releasing the tool from the spindle and operative to positively lock the spindle against rotation during the locking in or the releasing of the tool.

Another object of the invention is to provide a power tool lock in which the spindle is automatically positively prevented from rotating during the locking in or the release of the tool from the spindle and in which the spindle is free to rotate upon completion of the locking in or the release of the tool.

Other and further objects and advantages of the invention will be apparent from the following description of a preferred embodiment.

In the drawing:

Figure 1 is a longitudinal section of the spindle and the tool locking mechanism with the driving mechanism for the tool locking mechanism disengaged therefrom;

Fig. 2 is a fragmentary section of the spindle taken along its longitudinal axis to show the relation of the parts therein when the tool is initially inserted in the tool socket;

Fig. 3 is a fragmentary perspective view of a portion of the mechanism for positively locking the spindle against rotation;

Fig. 4 is a section along the line 4—4 in Fig. 1;

Fig. 5 is an exploded perspective view of the friction drive, cam, and spindle lock plunger for positively locking the spindle against rotation; and Fig. 6 is a perspective view of the speed responsive unit in the drive for the tool locking mechanism, in a disassembled position.

Referring to the drawings, the spindle 1 comprises an elongated generally cylindrical body having an axially extending passageway 2 extending therethrough. At one end of the spindle the passageway 2 is flared to define a socket 3 for receiving the tapered shank 4 of the tool 5. Concentrically arranged with the tool socket 3 are axially extending lugs 6 shaped to interfit in slots formed on a collar 7 on the shank 4 of the tool 5. Preferably the lugs 6 fit snugly in the slots on the collar when the tool is seated so that the lugs 6 engage the side walls of the slot to prevent rotation of the tool relative to the spindle 1. When the tool 5 is seated, the collar 7 is preferably spaced slightly from the outer axial face of the spindle 1 to assure a tight fit of the shank 4 in the socket 3. However, any suitable form of interlocking expedient may be used in lieu of the lugs 6 and the coacting slots. The outside diameter of the cylindrical portion of the tool shank 4 is slightly smaller than the diameter of the passageway 2 to further assure a tight fit of the tapered portion of the shank in the socket 3.

The spindle 1 in this instance is mounted for rotation and axial movement. The forward or tool-carrying end of the spindle is supported in a conventional manner, and for purposes of simplifying the drawings the details of this support have been omitted since they form no part of the present invention. The rear end of the spindle 1 is supported by ball bearings 8 journaled in a housing 9 forming a part of a slide designated generally by 10. In this instance two sets of ball bearings 8 are provided for journaling the rear end of the spindle. These bearings are disposed between a collar 12 mounted on the spindle and an annular gear member 119 mounted on the spindle adjacent to the rear end thereof and keyed thereto. A nut 20 threadedly received on the rear end of the spindle engages the opposite axial face of the gear member 119 and serves as a spacer for locating the gear member 119 and the inner races of the bearings 8 on the spindle and for holding the same in position against axial movement along the spindle. The outer race of each bearing 8 is received in a recess formed in a forward end wall 15 of the housing 9. The outer races of the bearings are retained between a shoulder 16 formed in the end wall 15 and a retainer 17 secured against the front of the end wall by suitable means such as screws. An oil seal 18 is supported in the retainer 17 and acts against the collar 12 to prevent leakage of lubricant from the housing 9. The collar 12 is supported on the rear portion of the spindle 1 which is of reduced size to form a shoulder 19. One axial face of the collar 12 abuts against the shoulder 19 and the other axial face is engaged by the inner race of the adjacent bearing 8.

The slide 10 (see Fig. 4) is formed with laterally extending arms 21 shaped to be supported on gib plates carried at the bottom of the side walls of the spindle housing (not shown). The arms 21 of the slide are thereby supported for reciprocation in a horizontal plane. Suitable lubrication passageways (not shown) are provided in the arms to effect lubrication between the arms 21 and the supports on the spindle housing along which they reciprocate. On its top the slide is formed with a collar 25 shaped to support the components of a lead screw nut assembly for receiving a lead screw (not shown). The lead screw nut assembly may be of any conventional construction and is not shown here since it forms no part of the present invention. The lead screw is suitably mounted in the spindle head in a conventional manner and coacts with the lead screw assembly carried by the collar 25 so that upon rotation of the lead screw the slide 10 and spindle 1 move lengthwise of the spindle housing, the direction of movement depending upon the direction preselected by the operator of the machine. A conventional clamping screw (not shown) may be provided for locking the slide in a desired adjusted position along the spindle housing.

The draw bar 30 in this instance is an elongated shaft extending lengthwise of the passageway 2 in the spindle 1. At its forward end the draw bar is journaled in a bushing 31 suitably supported in the passageway 2 adjacent to the tool socket. The extreme forward end of the draw bar 30 is shaped to be threadedly received in the threaded recess 32 in the shank 4 of the tool 5. While a threaded connection between the draw bar and the tool shank is preferred, my invention contemplates any equivalent or suitable means whereby connection will be established between the draw bar and the tool shank by power operation of the draw bar. At its rear end the draw bar is formed with a collar 33 disposed in an enlarged portion 34 of the passageway 2 at the rear end of the spindle 1. A suitable thrust bearing 35 is disposed between the collar 33 and a shoulder 36 formed in the passageway 2. A coiled compression spring 37 acting between the collar 33 and a sleeve 38, the purpose of which will presently appear, normally urges the draw bar in a forward direction so that the collar 33 abuts against the thrust bearing 35 and the threaded end of the draw bar is in the position it normally assumes when a tool 5 is locked in the spindle, as shown in Figure 1. The enlarged portion 34 of the passageway 2 is of sufficient length so that the collar 33 may be moved axially inwardly, when a force is applied axially inwardly to the forward end of the draw bar, to a position such that the slots in the collar 7 of the collar 5 may receive the axially extending lugs 6 on the spindle 1.

Mounted at the rear end of the draw bar 30 is a clutch mechanism. The latter includes a driving member and a driven member. The driven member is formed in part by the sleeve 38. The latter is received in a bushing 39 supported in the spindle at the extreme rear end of the enlarged portion 34 of the passageway 2. The sleeve 38 is connected to the extreme rear end of the draw bar 30 through a splined connection. At its outer end the sleeve 38 is formed with an annular flange 40 having one axial face shaped to abut against a thrust bearing 41 abutting against the rear axial face of the spindle 1. A retainer 42 engageable with the periphery of the flange 40 and the opposite axial face thereof secures the driven member in assembled relation with the spindle. The driving member of the clutch is also in the form of a sleeve 43 in axial alignment with the sleeve 38 and mounted on a shaft 44. The shaft is suitably supported by bearings 45 and 46 retained, respectively, in suitable recesses formed in a partition 47 and a rear end wall 48 of the housing 9. The sleeve 43 is mounted on the shaft 44 through a splined connection to permit axial movement of the sleeve relative to the shaft but at the same time preventing relative rotational movement of the sleeve with respect to the shaft. On its end adjacent to the shaft 44 the sleeve 43 is formed with an annular flange 49. Clutch teeth are formed respectively on the adjacent axial faces of the flanges 40 and 49. In this instance three annularly spaced clutch teeth 50 are formed on the flange 40 and three annularly spaced clutch teeth 51 shaped to mate with the clutch teeth 50 respectively are formed on the flange 49. The shape of the teeth is such that the left hand side of each tooth 51 is inclined at a greater angle (measured from a plane perpendicular to the face of the flange 49) than the right hand side of each tooth 51. Similarly the left hand side of each tooth 50 is inclined less than the right hand side of each tooth 50. The teeth 50 and 51 are spaced so that there may be a slight relative rotational movement between the teeth before engagement is effected.

When it is desired to thread the draw bar 30 into the threaded recess 32 of a tool, the driving member is rotated in a direction to cause the sides of the clutch teeth 50 which are inclined the greatest to engage the corresponding sides of the clutch teeth 51. When it is desired to unthread the draw bar 30 the driving member is rotated in a direction to cause the sides of the clutch teeth 50 which are inclined the least to engage the corresponding sides of the clutch teeth 51. With the above construction, the teeth of the driving member will be cammed relative to the teeth of the driven member should there be any slippage between the members when the draw bar is threaded into the recess 32 of a tool. When the driving member rotates in a counterclockwise direction of rotation such as when it is desired to unlock the tool, the less inclined sides of the clutch teeth 50 engage the corresponding sides of the clutch teeth 51. Due to this construction an impact blow can be effected between the driving member and the driven member when it is desired to unlock the tool. The impact blow facilitates removal of the draw bar 30 from the threaded recess 14 in the tool 5 in the event there should be a tendency of sticking between the parts.

The driving member is normally in a position in which it is spaced from the driven member, as shown in Figure 1. To this end the shaft 44 has an axially extending passageway 52. Disposed in this axially extending passageway 52 is an elongated rod 53. At one end the rod 53 extends through a washer 54, received in an axially facing recess 55 formed in the axial face of the sleeve 43, to receive a nut 56. A coiled compression spring 57 acts between an enlarged end 58 on the rod 53 and the shaft 44 to urge the driving member to the position in which the clutch teeth 50 are out of engagement with the clutch teeth 51, or, in other words, the driving member is normally urged to its disengaged position as shown in Figure 1.

Movement of the driving member to a position in which the clutch teeth 50 engage the clutch teeth 51 is under the control of a speed responsive or governor means. The speed responsive means, as best shown in Figs. 1 and 6, includes a pair of members 59 and 60, one of which is movable axially relative to the other a preselected distance in response to a preselected speed of rotation of the members to effect engagement of the clutch teeth 50 and 51.

The member 59 is generally in the form of a disc having a sleeve portion 61 rotatably mounted on a bushing 62 in turn rotatably mounted on the sleeve 43. At one end the member 59 is formed with gear teeth 63 for connection to the power means as described hereinafter. At this end the member 59 abuts against a spacer 64 mounted on the shaft 44 and in turn abutting against the inner race of the ball bearing 45. On the opposite end of the member 59 its axial face is formed with a plurality of annularly spaced radially extending recesses 96 shaped to receive spherical balls 65 (Fig. 6). The recesses are of such depth that a portion of each of the balls projects beyond the axial face of the member 59. The recesses are also shaped to form guideways for the balls as they move radially in response to speed changes of the member 59.

The member 60 includes a sleeve portion 66 mounted on the bushing 62. One axial face of the sleeve 66 is formed with diametrically opposed recesses 67 shaped to receive axially extending tongues 68 on the sleeve portion 61 of the member 59. The sleeve portion 66 and the sleeve portion 61 are of substantially the same diameter so that these parts serve to define the inner radial position of the balls or the position they assume when the member 59 is stopped or rotating at a relatively low speed. With the tongues 68 received in the slots 67 the members 59 and 60 are interlocked together and rotate as a unit. Intermediate the ends of the sleeve portion 66 is a radially extending flange 69. The latter at a position spaced outwardly from the sleeve portion is inclined at an angle toward the member 59 to define an inclined surface 70 engageable with the sides of the balls 65 and projecting beyond the recesses when the members 59 and 60 are in closely spaced side by side relation. At its extreme outer end the flange 69 terminates in a rim 73 concentric with the sleeve portion 66 of the member 60 and spaced outwardly therefrom. This rim serves to limit outward movement of the balls. A thrust washer 74 is disposed between the flange 49 on the sleeve 43 and the member 60 to permit relative rotation of the respective parts.

An electric motor 75, which forms the power means in the illustrated embodiment of the invention, is attached to the rear end wall 48 of the housing and has its shaft 77 extending inwardly thereof. Mounted on the inward extension 78 of the motor shaft is a gear 79 which meshes with the gear 80 mounted on shaft 44 between the partition 47 and the rear end wall 48. A spacer 81 is disposed between the gear 80 and the inner race of ball bearing 45. The motor and meshing gears form a power train which effects rotation of the shaft 44.

Mounted further inward within the housing 9 on the motor shaft extension 78 is a gear 82. This gear meshes with the gear 63 to rotate members 59 and 60, which form the speed responsive means.

In general, the gear train between the motor shaft 77 and the shaft 44 is such as to rotate the driving member 43 at a relatively low speed. The gearing between the motor shaft and the speed responsive means is such as to rotate the latter at a relatively high speed.

The motor 75 is a reversible motor and may be of any suitable design. Any suitable power means may be used for energizing the motor under the control of "forward" and "reverse" push buttons mounted on the spindle head accessible to the operator.

The spindle 1 is driven by a separate motor (not shown), which is controlled by a switch 83. For insuring that the spindle motor is de-energized while the clutch teeth 50 and 51 are in engagement, the switch 83 is mounted in the housing 84 of motor 75 by means of a bracket 85 attached to an end wall 86 of motor housing 84. A plunger 87 which controls switch 83 is positioned to be engaged by a push rod 88 supported to extend axially rearward from the enlarged head 58 on the rod 53. The switch 83 is controlled by plunger 87 such that when the rod 53 is in its retracted position the switch plunger 87 is depressed to close switch 83 and permit energization of the spindle motor. When the clutch teeth 50 and 51 are engaged the push rod 88 moves axially with the rod 53 away from engagement with switch plunger 87 and switch 83 opens to interrupt the circuit to the spindle motor.

However, in spite of the fact that the driving motor for the spindle is de-energized when the clutch teeth 50 and 51 engage during locking in or release of the tool from the spindle, it quite often happens that just when the tool is locked in the spindle a slight angular movement is imparted to the spindle before the motor 75 is stalled. This can be quite hazardous since such spindle movement imparts a slight rotation to the cutting tool, which might damage the hand of an operator who did not expect this to happen or who is careless. In order to completely avoid such hazards, the present invention incorporates mechanism for positively locking the spindle against angular movement until after the locking-in motor 75 has stalled.

As shown in Figure 1, the motor shaft extension 78 carries near its free end a friction cone 89. A friction ring 90 extends around the cone 89 and is formed with an internal conical surface which is adapted to abut snugly against the conical surface on the cone 89. A cam member 91 is formed with an integral rear flange 92 which is disposed closely adjacent the friction cone 89 and friction ring 90. An annular thrust bearing 93 is disposed between flange 92 and the friction cone and ring. A central axial recess 94 formed in the cam member 91 at the flange 92 receives roller bearings 95 (Fig. 5) forming an antifriction bearing for the reduced free end 78a of the motor shaft extension 78, on which the friction cone 89 is mounted. The flange 92 on the cam member 91 is formed with four evenly spaced holes 96 which are aligned with holes 97 extending axially through the friction ring 90. Bolts 98 extend through the aligned holes 96 and 97 and threadedly receive adjusting nuts 99 at their ends extending behind the friction cone. Coil springs 100 are seated under compression between the bolt heads and flange 92 to resiliently urge the friction ring 90 into frictional engagement with the conical head on friction cone 89.

Forward of the flange 92 the cam member 91 is formed with a stem 101 of circular cross-section. At its free end the stem 101 is cut away to form the cam portion 102, which includes a flat, normally horizontal, transverse surface 103 extending through the longitudinal rotational axis of the cam member 91, and flat inclined surfaces 104, 105 which extend downwardly away from the flat surface 103 to intersect the circular peripheral portion of stem 101.

The cam follower for cam member 91 is in the form of a generally cylindrical plunger 106 cut away at its lower end to form a semi-cylindrical lower end 107, including a flat axially extending vertical surface 108 and a semi-circular, flat transaxial surface 109 spaced from the lower extremity of the plunger. At its upper end the plunger is formed with a diametrically extending rack tooth 110 formed with a flat upper face 111 and depending sides 112 and 113 each inclined outwardly at an angle of twenty degrees with respect to vertical. At its lower end the plunger 106 carries a depending bolt 114 formed with an enlarged transverse head 115 at its lower end. Bolt 114 extends through a spring thrust plate 116 below the plunger 106. A coil spring 117 under compression between the cover plate 116 and the bolt head 115 normally resiliently urges the plunger to its lower position, with its transaxial flat surface 109 resting against the flat surface 103 on the cam. A cover plate 118 encloses the lower end of bolt 114 and the coil spring 117 thereat.

An annular spindle lock gear 119 surrounds the spindle 1 and is keyed thereto to move in unison therewith. As best seen in Figs. 1 and 4, this gear is disposed immediately above the toothed upper end 110 of spindle lock plunger 106 and carries a plurality of gear teeth between which the plunger tooth 110 is adapted to engage to positively lock the spindle against rotary movement. These gear teeth also are formed with the twenty degrees angular inclination at each side, as in the plunger gear tooth 110. In the normal retracted position of plunger 106 its spindle lock tooth 110 is withdrawn away from engagement with the spindle lock gear, as shown in Figure 1, and the spindle 1 is free to rotate under the control of its motor. However, as described in more detail hereinafter, whenever the motor shaft 77 is rotating the spindle lock plunger 106 is displaced upwardly to move its tooth 110 into engagement between adjacent teeth on spindle lock gear 119, to positively hold the spindle 1 against rotary movement as long as motor shaft 77 is rotating.

In the operation of the invention, with the spindle at rest and the draw bar 30 urged to its forward position by the spring 37, the rod 53 maintaining the clutch teeth 50 out of engagement with clutch teeth 51 urges the push rod 88 to depress switch plunger 87 to close the circuit to the spindle motor. However, the spindle motor is not energized since its operator-controlled push button is not depressed.

To lock a cutting tool 5 in the spindle the operator of the machine tool places the tool 5 so that the shank 4 is received in the tool socket 3. The end of the shank will engage the end of the draw bar 30. With the parts in this position the shank 4 will not be completely seated in the tool socket. The operator therefore applies an axial pressure against the end of the draw bar 30 (to the right viewing Fig. 2) and through application of this force on the tool 5 compresses the spring 37, the compression force of which spring then acts between the collar 33 and the sleeve 38 to urge the draw bar forwardly (to the left viewing Fig. 2). The tool is further moved by hand of the operator to the right axially relative to the spindle until the lugs 6 are received in the slots formed in the collar 7.

While so holding the tool with one hand the operator with his other hand presses the "forward" push button to cause the motor 75 to operate in a direction such that the teeth 51 rotate in a counter-clockwise direction of rotation viewed from the front of the spindle. At this instant the clutch teeth 50 and 51 are not engaged but will almost instantly be engaged by the action of the speed responsive unit, as will now be described. Simultaneously with this operation of the clutch teeth 51 the speed responsive unit is driven by the motor through the gears 62 and 63. This causes the members 59 and 60, which are interlocked together through the tongue and slot connection, to rotate. As the speed of the motor shaft 77 increases the members 59 and 60 rotate more rapidly. As the speed of rotation increases the balls 65 tend to move radially outwardly by centrifugal force. When the balls move radially outwardly they engage the inclined surface 70 and force the member 60 axially (to the left, viewing Figure 1) away from the member 59 by a wedging or camming action. When the members 59 and 60 reach a preselected speed, in this instance the speed effected approximately when the motor reaches its maximum speed, sufficient centrifugal force is exerted by the balls 65 so that the member 60 is urged axially to the left by the camming action to a position where the teeth 51 engage the teeth 50 in driving engagement therewith. In so doing the member 60 abuts against the thrust washer 74 and the sleeve 43 is moved axially to the left relative to the spline portion of the shaft 44. Simultaneously the spring 57 is compressed (by the described axial movement of the sleeve 43 acting through the washer 54 and the rod 53) and the push rod 88 moves to the left out of engagement with the plunger 87 of the switch 83 so that the switch moves to its normally open position to interrupt the circuit to the spindle motor. When the clutch teeth 51 engage the clutch teeth 50, the sleeve 38 rotates and in turn effects rotation of the draw bar 30 through the splined connection therebetween. This rotation of the draw bar is at a relatively slow speed because drive is through the gear train to shaft 44 and the clutch teeth 51, 50. This rotation of the draw bar screws the draw bar threads into the threaded recess 32 formed in the shank of the tool 5. While the draw bar 30 is rotated, the spring 37 which was compressed upon the insertion of the tool 5 in the tool socket acts to urge the draw bar 30 in the direction of the tool 5 to assure a good initial contact between the draw bar and the tool 5 to thereby assure engagement of the threads.

As the power drive draw bar 30 continues to thread into the threaded socket 32 of the tool 5 the tool is drawn into the socket 3 of the spindle and is seated therein. At the time when the tool just seats in the spindle socket the momentarily continuing relation of draw bar 30, in the absence of positive means for preventing it, would impart a slight rotary movement, through the snugly seated tool in the spindle socket, to the spindle itself, resulting in the already described possibility of injuring the operator's hand before the motor 75 is stalled.

During rotation of the motor shaft 77, the spindle lock plunger 106 is displaced upwardly to position its upper tooth 110 in locking engagement with spindle lock gear 119, whereby to lock the spindle against any rotary movement which might occur before motor 75 is stalled. During the initial rotation of motor shaft 77 for locking the tool in the spindle, the motor shaft extension 78, acting through the friction drive 89, 90, causes rotary movement of the cam member 91. The inclined cam surface 104 moves into engagement with the flat cam follower face 109 to displace plunger 106 upward to lock its tooth 110 in engagement with the spindle lock gear. Continuing rotation of shaft 78 during the further action of the mechanism for locking in the tool is taken up by the friction clutch arrangement 89, 90 and the cam member 91 maintains the cam follower 106 in its upper position to positively lock the spindle against any rotary movement as long as motor shaft 77 is rotating.

After the tool has been fully seated, the motor 75 comes to a dead stop, which condition will be evident to the operator by the feel of the tool or by the sound of the motor. When thus assured that the tool is fully seated, the operator removes his hand from the "forward" push button for motor 75 and thereby de-energizes that motor. Prior to this, the stalling of the motor has caused the draw bar driving mechanism and the speed responsive mechanism to cease to rotate. However, until the motor 75 is de-energized, by releasing its "forward" push button, the torque through the draw bar driving mechanism exerts a frictional force on the clutch teeth 51, 50 sufficient to maintain them in engagement. After the motor 75 is de-energized to remove the motor torque from the draw bar driving mechanism, the latter is free to return to the normal disengaged position shown in Figure 1.

Also, with the removal of the torque from motor 75, the coil spring 117 acts against bolt 114 to return spindle lock plunger 106 to its normal retracted position away from locking engagement with gear 119. However, in the event that the force of spring 117 is insufficient to retract the spindle lock plunger the heavy torque applied to the gear 119 when the spindle motor is turned on will readily force the plunger 106 down to its retracted position. With this precaution in mind, both the teeth of gear 119 and the tooth 110 on the spindle lock plunger have been made purposely with a relatively broad incline to permit their ready separation and retraction of the spindle lock plunger when a heavy continuing torque is imparted to the spindle.

After use of the tool in the ordinary manner it may be unlocked and removed automatically from the spindle 1 by pressing the "reverse" push button for motor 75, to cause motor shaft 77 to rotate counter-clockwise, viewed from the front of the spindle. Shaft 44 is caused to rotate clockwise and the speed responsive unit causes the clutch teeth 50 and 51 to inter-engage. The steeper sides of these teeth engage, because of the direction of rotation of shaft 44, so that an impact is imparted to the teeth 50 when the teeth 51 first move into engagement therewith which assists in initiating the unthreading of the draw bar 30 from the tool 5. Also during further unthreading of the draw bar the full power of motor 75 may be utilized in effecting such withdrawal of draw bar 30 from the tool 5 because of the engagement of teeth 51 and 50 at their steep sides. When the draw bar 30 has been withdrawn fully from threaded engagement with the tool 5 the operator releases the "reverse" push button for motor 75 and removes tool 5.

It will be apparent from the foregoing that any rotary spindle movement is positively prevented during the described automatic releasing of the tool from the spindle. The described reverse rotation of motor shaft 77 causes the cam member 91 to be rotated to cause its inclined face 105 to engage the lower flat cam-follower face 109 on spindle lock plunger 106 and push the plunger into locking engagement with the spindle lock gear 119. The cam 91 and spindle lock plunger 106 are maintained in this position until motor 75 is again de-energized, after the tool has been removed from the spindle.

The invention herein disclosed is particularly advantageous and desirable in the practical operation of a power operated tool lock mechanism.

While a preferred embodiment of the present invention and its mode of operation have been described herein, it is to be understood the modifications in the disclosed form of the invention may be resorted to without departing from the spirit and scope of the invention.

I claim:

1. In a tool locking mechanism, the combination of a spindle having a socket for receiving the tool, tool moving means mounted on the spindle operative to move the tool into the spindle socket to be seated therein, an electric motor having an output shaft coupled by a driving connection to the tool moving means operative to effect said operation of the tool moving means upon rotation of the motor shaft, and spindle lock means actuated in response to the rotation of the motor shaft operative to lock the spindle against rotation during said rotation of the motor shaft, said spindle lock means including a gear connected to rotate with the spindle, a plunger having a gear tooth on one end and mounted to slide radially with respect to the spindle gear to move its gear tooth into and out of locking engagement with the spindle gear, and means operated by rotation of the motor output shaft to cause the plunger to move into said locking engagement.

2. In a tool locking mechanism, the combination of a spindle having a socket for receiving the tool, a draw bar operative upon rotation relative to the spindle to draw the tool into the spindle socket to be seated therein, an electric motor having an output shaft coupled by a driving connection to the draw bar to effect said rotation thereof in response to rotation of the motor shaft, a gear carried on the spindle to move integral therewith, a reciprocable spindle lock plunger, and means forming a driving connection from the motor shaft to the spindle lock plunger operative in response to the rotation of the motor shaft to move the spindle lock plunger into engagement with the gear and operative to maintain the spindle lock plunger in engagement with the gear during rotation of the motor shaft to lock the spindle against rotation.

3. An automatic tool lock comprising in combination with a tool having a tapered shank and a spindle having a tapered socket, a draw bar carried on the spindle and operative upon rotation relative to the spindle to draw the tool into the spindle socket to be seated therein, an electric motor having an output shaft coupled by a driving connection to the draw bar to effect said rotation thereof responsive to rotation of the motor shaft, a gear carried on the spindle to move integral therewith, a reciprocable spindle lock plunger, and means including a friction drive forming a driving connection from the motor shaft to the spindle lock plunger operative in response to the rotation of the motor shaft to move the plunger into engagement with the gear and operative to maintain the plunger in that position as long as the motor shaft rotates, to lock the spindle against rotation.

4. An automatic tool lock comprising in combination with a tool having a tapered shank and a spindle having a tapered socket, a draw bar carried on the spindle and operative upon rotation relative to the spindle to draw the tool into the spindle socket to be seated therein, an electric motor having an output shaft coupled by a driving connection to the draw bar to effect said rotation thereof in response to rotation of the motor shaft, a gear carried on the spindle to move integral therewith, a reciprocable spindle lock plunger having a cam follower surface, a cam member engaging said cam follower surface on the plunger, and means including a friction drive forming a driving connection from the motor shaft to the cam member, the cam member being moved in response to the rotation of the motor shaft to displace the plunger into engagement with the gear to lock the spindle against rotation and the cam member being maintained in said position as long as the motor shaft rotates, to maintain the spindle locked against rotation.

5. In a tool locking mechanism, the combination of a spindle having a tool-receiving socket, a draw bar coaxial in the spindle and operative upon rotation relative to the spindle in one direction to draw the tool into the spindle socket to be seated therein and operative upon rotation relative to the spindle in the other direction to unseat the tool from the spindle socket, a reversible electric motor having an output shaft parallel with and offset with respect to the spindle, said output shaft being coupled by a driving connection to the draw bar to effect said rotations thereof in response to the rotation of the motor shaft, a gear coaxial on the spindle to move integral therewith, a reciprocable spindle lock plunger having a gear tooth at one end operative in one position to engage its gear tooth with the gear to lock the spindle against rotation, and means forming a driving connection from the motor shaft to the spindle lock plunger including a cam member coacting with the plunger, the cam member being operative in response to the rotation of the motor shaft in either direction to move the spindle lock plunger into engagement with the gear and operative to maintain the spindle lock plunger in that position as long as the motor shaft rotates.

6. An automatic tool lock comprising in combination with a tool having a tapered shank and a spindle having a tapered socket to receive the tool shank, a draw bar on the spindle having means operable by rotation of the draw bar to connect with the tool shank and seat it in the spindle socket, an electric motor, mechanism operated by the motor for rotating the draw bar to effect said tool seating including a normally disengaged clutch and means operable following the attainment of a predetermined speed of said motor for causing said clutch to engage, and spindle lock means actuated directly in response to the operation of said motor operated mechanism to lock the spindle against rotation during the operation of said motor operated mechanism.

7. In a tool locking mechanism, the combination of a tool, a spindle having a tool socket at one end, a rotatable draw bar mounted on the spindle and threadably engageable with said tool, power means for rotating said draw bar in either direction of rotation, a clutch mechanism between the power means and the draw bar operable to connect the power means to and disconnect it from the draw bar, said power means including a prime mover and a speed responsive means driven by the prime mover, said speed responsive means operating to cause engagement of said clutch mechanism when the speed of rotation of said speed responsive means exceeds a preselected value in one direction of rotation whereby to effect threaded engagement of the draw bar and tool to secure the tool in the socket, and spindle lock means operated by and simultaneously with rotation of said prime mover to lock the spindle against rotation and hold it locked during the operation of said prime mover and said speed responsive means to secure the tool in the socket.

8. In a tool locking mechanism, the combination of a tool, a spindle having a tool socket at one end to receive said tool, a rotatable draw bar threadably engageable with said tool, power means for rotating said draw bar in either direction of rotation, a clutch mechanism between the power means and the draw bar operable when the speed of rotation of said power means exceeds a preselected value in one direction of rotation to effect threaded engagement of the draw bar and tool to secure the tool in the socket and operable when the speed of rotation of said power means exceeds a preselected value in the opposite direction of rotation to unthread the draw bar from the tool to permit removal of the tool from the socket, and spindle lock means actuated by and simultaneously with rotation of the power means to lock the spindle against rotation during operation of the power means in either direction.

CHARLES B. DE VLIEG.

References Cited in the file of this patent

UNITED STATES PATENTS

| Number | Name | Date |
|---|---|---|
| 1,455,283 | Bullard | May 15, 1923 |
| 1,794,361 | Armitage | Mar. 3, 1931 |
| 2,349,959 | Guetzkow | May 30, 1944 |
| 2,441,046 | Turrettini | May 4, 1948 |
| 2,501,421 | Stephan | Mar. 21, 1950 |
| 2,557,582 | Turrettini | June 19, 1951 |
| 2,585,955 | May | Feb. 19, 1952 |